United States Patent
Iqbal et al.

(10) Patent No.: US 8,873,466 B2
(45) Date of Patent: Oct. 28, 2014

(54) TIMING EVENT GENERATION CIRCUIT FOR MOBILE COMMUNICATION DEVICE

(71) Applicant: Freescale Semiconductor, Inc., Austin, TX (US)

(72) Inventors: Asif Iqbal, Cambridge, MA (US); Somvir Dahiya, Noida (IN); Nikhil Jain, Pilani (IN); Rajan Kapoor, Faridabad (IN); Saleem Mohamedali, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 153 days.

(21) Appl. No.: 13/650,138

(22) Filed: Oct. 12, 2012

(65) Prior Publication Data

US 2014/0105185 A1    Apr. 17, 2014

(51) Int. Cl.
*H04W 88/06*    (2009.01)
*H04W 88/10*    (2009.01)

(52) U.S. Cl.
CPC .............. *H04W 88/06* (2013.01); *H04W 88/10* (2013.01)
USPC ........................................................ 370/328

(58) Field of Classification Search
USPC .............................. 370/328, 395.5; 455/127.4
See application file for complete search history.

(56) References Cited

U.S. PATENT DOCUMENTS

| | | | |
|---|---|---|---|
| 5,864,549 A * | 1/1999 | Honkasalo et al. | 370/335 |
| 8,081,596 B1 | 12/2011 | Buracchini | |
| 8,150,468 B2 | 4/2012 | Gao | |
| 2003/0214916 A1 * | 11/2003 | Khawand et al. | 370/278 |
| 2004/0018853 A1 * | 1/2004 | Lewis | 455/552.1 |
| 2005/0053092 A1 * | 3/2005 | Yang | 370/468 |
| 2011/0160998 A1 | 6/2011 | Rissanen | |
| 2011/0207473 A1 * | 8/2011 | Swaminathan et al. | 455/456.1 |
| 2012/0120849 A1 | 5/2012 | Kazmi | |
| 2012/0195232 A1 | 8/2012 | Mahkonen | |

OTHER PUBLICATIONS

Teletopix, How Synchronization Channel Works in LTE, Feb. 22, 2012, http://www.teletopix.org/4g-lte/how-synchronization-channel-works-in-lte.*

* cited by examiner

*Primary Examiner* — Hoon J Chung
(74) *Attorney, Agent, or Firm* — Charles Berqere

(57) ABSTRACT

A system or circuit for generating timing events for mobile communications includes fetching network parameters corresponding to a cellular network. The network parameters are used to program a set of programmable registers. The timing events then are generated based on the network parameters. The timing events enable a user equipment (UE) or a base station to operate in multiple cellular networks.

15 Claims, 4 Drawing Sheets

TIMING EVENT GENERATION CIRCUIT FOR MOBILE COMMUNICATION DEVICE

BACKGROUND OF THE INVENTION

The present invention relates generally to mobile communications, and, more particularly, to a system for generating timing events in mobile communication network.

Recent mobile communication networks have been developed to operate according to various mobile telephony standards, viz., wideband code division multiple access (W-CDMA), narrowband CDMA (N-CDMA), global system for mobile communications (GSM), and long term evolution (LTE). These different standards use different frame structures to count sub-frames in a frame, count slots in a sub-frame, count chips in a slot, and count symbols in a slot, and these differing frame structures necessitate the use of different timing event generation schemes.

Timing events usually are generated by a radio-frequency (RF) timer that is integrated in a user equipment (UE) or a base station. The RF timer generates the timing events using a hardware timing event generation logic circuit. The base station starts transmission and reception based on the timing events from the RF timer, and the UE transmits and receives data from the base station based on these generated timing events. Using a hardware timing event generation logic circuit causes the UE or the base station to be compatible only with a single cellular network. For example, a base station or UE that includes such a hardware circuit connected to a GSM network will be compatible with the GSM network alone and is not operable with other cellular networks.

The operation of a UE across multiple standards may be enabled with a multi-mode UE. However, manufacturing economical and ergonomic multi-mode UEs has many challenges. Due to wide differences in base band processing across different standards, hardware sharing inside a multi-mode UE is a difficult task, requiring integrating separate hardware components for each standard, which substantially increases the price and size of the UE. Presently, there is no system to render the base station compatible with multiple cellular networks. Thus, multiple base stations are installed and maintained for operating in multiple cellular networks, which further increases operational costs.

Therefore, it would be advantageous to have a system and method for generating timing events in either or both a UE and a base station that supports multiple mobile telephony standards.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
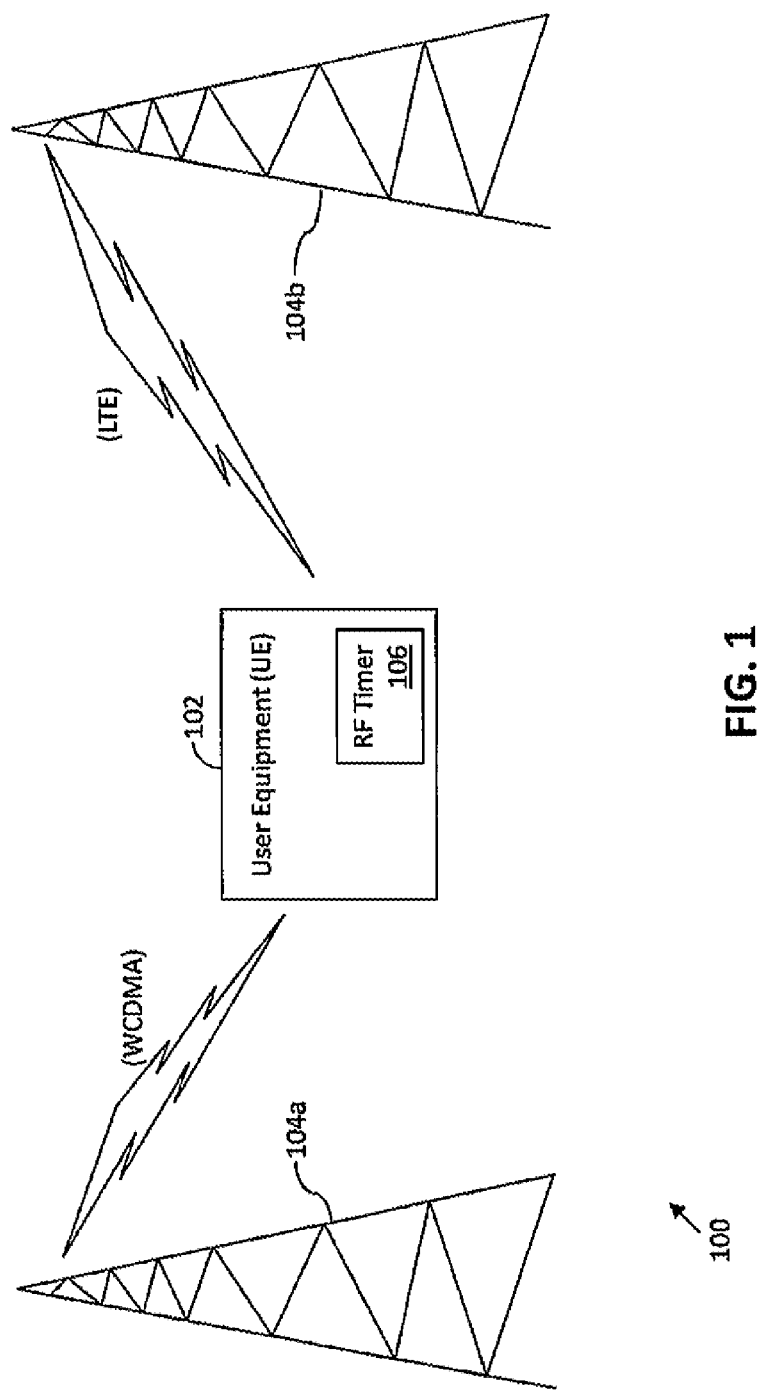
FIG. 1 is a schematic diagram illustrating a mobile communication system in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a RF timer for generating a plurality of timing events to enable a wireless communication device to operate in a plurality of cellular networks is provided. The wireless communication device includes at least one of a user equipment (UE) and a base station. The RF timer includes a memory module for storing a plurality of sets of network parameters corresponding to the plurality of cellular networks. A plurality of programmable registers capable of being configured using at least one of the sets of network parameters is coupled to the memory module. Further, an event generation logic circuit, coupled to the plurality of programmable registers, generates the plurality of timing events based on a first set of the network parameters corresponding to a first cellular network for enabling the wireless communication device to operate in the first cellular network.

In another embodiment of the present invention, a wireless communication device capable of operating in a plurality of cellular networks is provided. The wireless communication device includes a RF timer for generating a plurality of timing events. The RF timer includes a memory module for storing a plurality of sets of network parameters corresponding to the plurality of cellular networks. A plurality of programmable registers capable of being configured using at least one of the sets of network parameters are connected to the memory module. Further, an event generation logic circuit, coupled to the plurality of programmable registers, generates the plurality of timing events based on a first set of the network parameters corresponding to a first cellular network for enabling the wireless communication device to operate in the first cellular network.

In yet another embodiment of the present invention, a method for generating a plurality of timing events by a RF timer of a wireless communication device to enable the wireless communication device to operate in a plurality of cellular networks is provided. The method includes storing a plurality of sets of network parameters corresponding to the plurality of cellular networks in a memory module of the RF timer. A plurality of programmable registers is programmed using a first set of the network parameters corresponding to a first cellular network. Thereafter, the plurality of timing events are generated by the RF timer based on the first set of the network parameters, to enable the wireless communication device to operate in the first cellular network.

Various embodiments of the present invention provide a system and method for generating timing events by a RF timer of a wireless communication device to enable the wireless communication device to operate in a plurality of cellular networks. The wireless communication device may include a UE or a base station. The method includes storing sets of network parameters that correspond to multiple cellular networks, in a memory module of the RF timer. A set of network parameters corresponding to a cellular network is used to program a set of programmable registers. The timing events are generated based on the network parameters used to program the set of programmable registers, thereby enabling the UE or the base station to operate across multiple cellular networks including wideband code division multiple access, frequency-division duplexing (W-CDMA-FDD), narrowband CDMA (N-CDMA), global system for mobile communications (GSM) and long term evolution, time division duplexing (LTE-TDD). When the RF timer of the present invention is used in a base station, the base station can operate across with multiple cellular networks, which eliminates costs associated with installing and maintaining multiple base stations corresponding to multiple cellular networks. Similarly, when the RF timer is used in a UE, the UE can communicate across different types of cellular networks without the need for integrating separate hardware for each standard. Thus, the cost and size of the UE is considerably reduced and challenges associated with the production of multi-mode UEs are significantly eliminated.

Figure 2:
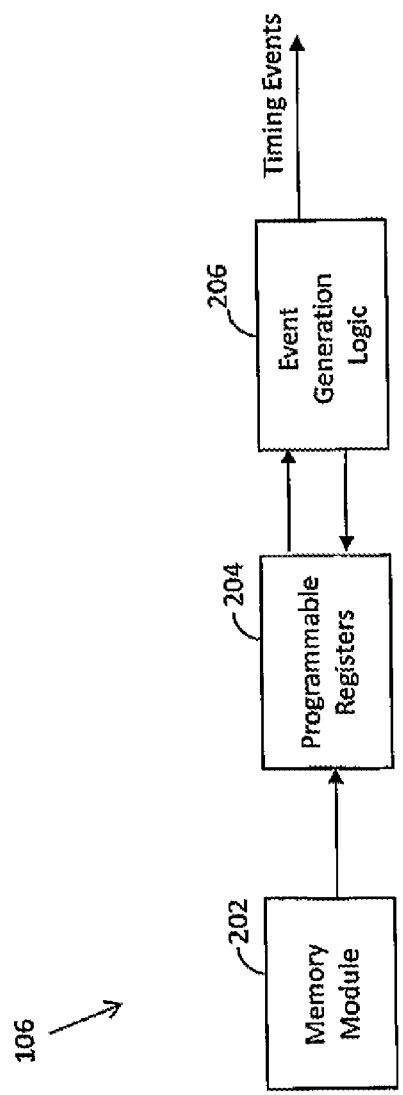
FIG. 2 is a schematic block diagram illustrating a RF timer in accordance with an embodiment of the present invention.

Referring now to FIG. 1, a schematic diagram illustrating a mobile communication system 100, in accordance with an embodiment of the present invention, is shown. The mobile communication system 100 includes a user equipment (UE) 102 and a plurality of base stations including first and second base stations 104a and 104b (collectively referred to as base stations 104). The UE 102 includes a RF timer 106.

present invention, is shown. The RF timer 106 includes a memory module 202, a set of programmable registers 204, and an event generation logic circuit 206. FIG. 2 is explained in detail in conjunction with FIG. 1 below.

The memory module 202 stores sets of network parameters corresponding to various cellular networks. In an embodiment of the present invention, the memory module 202 stores a lookup table (similar to Table-A, shown below) that includes sets of network parameters corresponding to various cellular networks including N-CDMA, W-CDMA-FDD, LTE-FDD, LTE-TDD, and GSM. In various embodiments of the present invention, the network parameters include count of sub-frames in a frame, count of slots in a sub-frame, count of symbols in a slot, uplink (UL), downlink (DL), special slot (SP) slot attributes, downlink pilot time slot (DwPTS) and uplink pilot time slot (UpPTS) lengths. The programmable registers 204 are configured using one of the sets of network parameters that correspond to a preselected cellular network for which the timing events need to be generated. For example, when the preselected cellular network corresponding to which the timing events need to be generated is a GSM network, then corresponding network parameters are used for programming the programmable registers 204. Similarly, network parameters corresponding to other cellular networks are used for programming the set of programmable registers 204.

TABLE A

| Network Parameters | Network Mode | | | | |
|---|---|---|---|---|---|
| | NCDMA | WCDMA-FDD | LTE-FDD | LTE-TDD | GSM |
| LEN | 16 | 16 | 2048 + CP | 2048 + CP | 628 |
| SYM_PER_SLOT | 6 | 16 | 5, 6, 7 | 5, 6, 8 | 4, 8 |
| TOTAL_LEN | 128 | 256 | 15360 | 15361 | 130000 or 255000 |
| UPPTS_LEN | NA | NA | NA | 2191-5120 | NA |
| DWPTS_LEN | NA | NA | NA | 6592-26636 | NA |
| CHIPS_PER_SLOT | 64 | 64 | 15360 | 15360 | 5000 |
| SLOT_PER_SUBFRM | 2 | 10 | 2 | 2 | 51 or 26 |
| SUBFRM_PER_FRM | 16 | 15 | 10 | 10 | 26 or 51 |
| DLSLOT | FFFFF | FFFFF | FFFFF | FFE00 | FFFFF |
| ULSLOT | FFFFF | FFFFF | FFFFF | 000FF | FFFFF |
| SPSLOT | 0 | 0 | 0 | h00100 | FFFFF |

The UE 102 communicates with the first and second base stations 104a and 104b based on timing events generated by the RF timer 106. In an embodiment of the present invention, the first and second base stations 104a and 104b and the UE 102 are examples of wireless communication devices and communicate in different cellular networks according to at least one of W-CDMA, N-CDMA, GSM, and LTE mobile telephony standards. The first and second base stations 104a and 104b are at least one of legacy base stations, picocells, and femtocells. The RF timer 106 is pre-programmed to generate timing events corresponding to a preselected cellular network. Thus, the RF timer 106 generates timing events corresponding to one of the W-CDMA, N-CDMA, GSM, and LTE networks and makes the UE 102 compatible with more than one cellular network. In an embodiment of the present invention, the RF timer 106 is located inside a base station such as the first and second base stations 104a and 104b. The RF timer 106 makes the base stations 104 compatible with the multiple cellular networks by generating the timing events corresponding to one of the above mentioned cellular networks.

Referring now to FIG. 2, a schematic diagram illustrating the RF timer 106, in accordance with an embodiment of the The programming of the programmable registers 204 includes storing the network parameters into the programmable registers 204. Each network parameter is stored in a programmable register 204 (see FIG. 3).

The event generation logic circuit 206 reads the network parameters stored in the programmable registers 202 and generates timing events in accordance with the network parameters. The timing events include signals for a wireless communication device (i.e., the UE 102 or the base stations 104) that indicate boundaries of frames, sub-frames, and symbols in a received or a transmitted signal. Such generation of timing events is well known in the art, and therefore a detailed description has been omitted from the present description so as not to obfuscate the invention.

Figure 3:
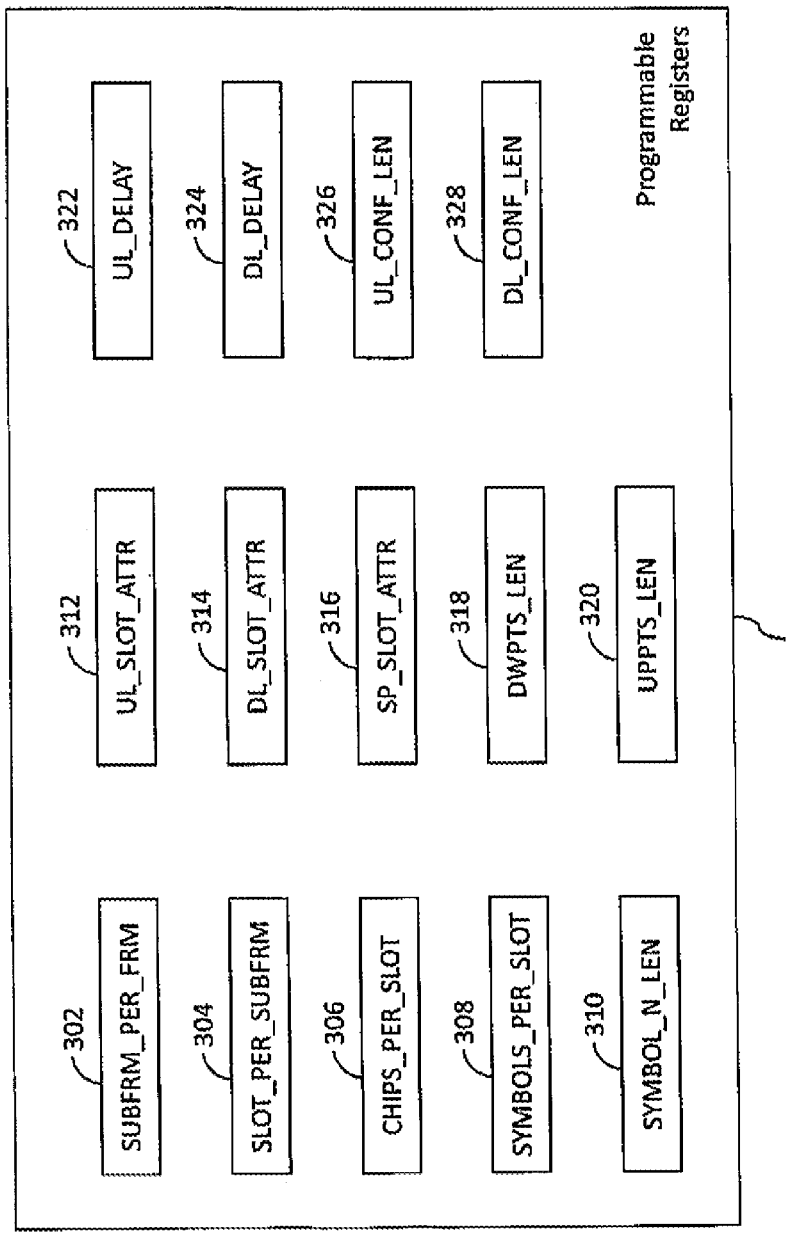
FIG. 3 is a schematic block diagram illustrating programmable registers in the RF timer of FIG. 2 in accordance with an embodiment of the present invention.

Referring now to FIG. 3, a schematic diagram of the programmable registers 204 in accordance with an embodiment of the present invention is shown. The programmable registers 204 include a sub-frame-per-frame register 302, a slot-per-sub-frame register 304, a chips-per-slot register 306, a symbols-per-slot register 308, a plurality of symbol length registers 310, a plurality of uplink attribute registers 312, a plurality of downlink attribute registers 314, a plurality of special attribute registers 316, a downlink pilot time register 318, an uplink pilot time register 320, an uplink delay register 322, a downlink delay register 324, an uplink configuration length register 326, and a downlink configuration length register 328.

The programmable registers 204 are located inside the RF timer 106 and the RF timer 106 is located inside the wireless communication device such as the UE 102 or the base stations 104. It will be understood by persons skilled in the art that cellular communication allows the UE 102 and the base stations 104 to transmit and receive data in the form of frames, in which each frame includes one or more sub-frames, each sub-frame is divided into slots, and each slot includes symbols. Each cellular network has a different count of sub-frames in a frame, slots in a sub-frame, and symbols in a slot. For example, N-CDMA has 16 sub-frames per frame, 2 slots per sub-frame, and 4 symbols per slot and W-CDMA has 15 sub-frames per frame, 10 slots per sub-frame, and 16 symbols per slot. Further, when the UE 102 and the base stations 104 communicate in a frequency-division multiplexing (FDD) mode, separate channels are assigned for UL and DL communication. However, when the UE 102 and the base stations 104 communicate in a time-division multiplexing (TDD) mode, the same channel is used for UL and DL communication and the role of the channel as a UL or DL channel alters every fixed time period. Thus, a slot will be a UL slot for a UL cycle and a DL slot for a DL cycle. Further, when the slots transition from DL to UL, a time gap in the form of a SP slot is inserted to prevent symbols at the boundary of the last DL and first UL slots from interfering. Therefore, each slot has UL, DL and SP slot attributes to indicate whether a slot is a UL, DL, or SP slot, respectively. When the UE 102 operates in LTE-TDD and W-CDMA cellular networks, special sub-frames are inserted for which DwPTS and UpPTS lengths need to be configured. The parameters associated with a cellular network, viz., count of sub-frames in a frame, count of slots in a sub-frame, count of symbols in a slot, UL, DL, SP slot attributes, DwPTS and UpPTS lengths, and the like are collectively referred to as network parameters.

The network parameters are used to program the programmable registers 204 to configure the UE 102 to operate in a preselected cellular network. For example, the sub-frame-per-frame register 302 stores the sub-frames in a frame count, the slot-per-sub-frame register 304 stores the slots in a sub-frame count, the chips-per-slot register 306 stores the chips in a slot count, the symbols-per-slot register 308 stores the symbols in a slot count, the symbol length registers 310 store the symbol lengths of the symbols, the plurality of uplink attribute registers 312 store the uplink slot attributes of corresponding slots, the plurality of downlink attribute registers 314 store the downlink slot attributes of the corresponding slots, the plurality of special attribute registers 316 store the special slot attributes of the corresponding slots, the downlink pilot time register 318 stores DwPTS length, the uplink pilot time slot register 320 stores UpPTS length, the uplink delay register 322 stores the uplink delay, the downlink delay register 324 stores the downlink delay, the uplink configuration length register 326 stores the uplink configuration length, and the downlink configuration length register 328 stores the downlink configuration length. It will be understood by a person skilled in the art that the RF timer 106 need not include all of the programmable registers 204 mentioned above and may be customized to include a select number of the programmable registers 204 based on the desired operating functionality of the UE 102.

Figure 4:
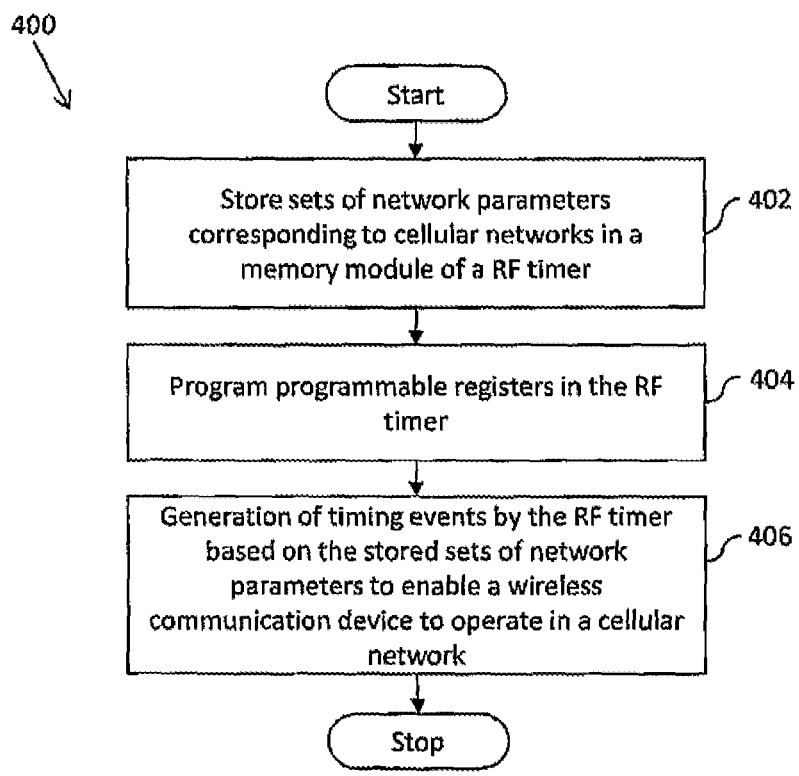
FIG. 4 is a flowchart illustrating a method for generating a plurality of timing events by the RF timer of FIG. 2 in accordance with an embodiment of the present invention.

Referring now to FIG. 4, a flowchart 400 illustrating a method for generating timing events by the RF timer 106 to enable a wireless communication device to operate in multiple cellular networks in accordance with an embodiment of the present invention is shown.

At step 402, network parameters that correspond to various cellular networks are stored in a lookup table in the memory module 202. For example, the lookup table shown above as Table-A includes network parameters corresponding to N-CDMA, W-CDMA-FDD, LTE-FDD, LTE-TDD, and GSM. At step 404, the programmable registers 204 are programmed using network parameters that correspond to the cellular network for which timing events are to be generated. The network parameters are fetched from the lookup table. The programming of the programmable registers 204 includes storing the network parameters in the programmable registers 204. At step 406, timing events are generated by the event generation logic circuit 206 based on the network parameters stored in the programmable registers 204, which enable the operation of the wireless communication device (the UE 102 or the base stations 104), in the cellular network corresponding to which the programmable registers 204 are programmed. The timing events indicate boundaries of frames, sub-frames, symbols, and the like in a received or a transmitted signal. In an embodiment of the present invention, the RF timer 106 may be located inside the base stations 104 or the UE 102.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A radio-frequency (RF) timer for generating a plurality of timing events to enable a wireless communication device to operate in a plurality of different cellular networks, wherein the wireless communication device includes at least one of a user equipment (UE) and a base station, the RF timer comprising:

a memory module for storing a plurality of sets of network parameters corresponding to the plurality of different cellular networks;

a plurality of programmable registers, coupled to the memory module, that are configurable using at least one of the sets of network parameters; and an event generation logic circuit, coupled to the plurality of programmable registers, for generating the plurality of timing events based on a first set of the network parameters corresponding to a first cellular network of the plurality of different cellular networks for enabling the wireless communication device to operate in the first cellular network, wherein the wireless communication device transmits and receives data in a plurality of frames, each frame including a plurality of sub-frames, each sub-frame including a plurality of slots, and each slot including a plurality of symbols, and wherein the plurality of slots are synchronized using a timing reference that is common between the wireless communication device and a cellular network.

2. The RF timer of claim 1, wherein the plurality of cellular networks operate in accordance with at least one of wideband code division multiple access (W-CDMA), narrowband CDMA (N-CDMA), global system for mobile communications (GSM), and long term evolution (LTE) standards.

3. The RF timer of claim 1, wherein the wireless communication device communicates in at least one of time-division duplex (TDD) and frequency-division duplex (FDD) modes.

4. The RF timer of claim 1, wherein a set of network parameters includes at least one of sub-frames in a frame count, slots in a sub-frame count, chips in a slot count, symbols in a slot count, symbol length, uplink downlink delays, downlink pilot time slot (DwPTS) length, uplink pilot time slot (UpPTS) length, uplink slot attribute, downlink slot attribute, special slot attribute, uplink configuration length, and downlink configuration length in accordance with an operation standard of a cellular network.

5. The RF timer of claim 4, wherein the plurality of programmable registers includes at least one of:
   a sub-frame-per-frame register for storing the sub-frames in a frame count;
   a slot-per-sub-frame register for storing the slots in a sub-frame count;
   a chips-per-slot register for storing the chips in a slot count;
   a symbols-per-slot register for storing the symbols in a slot count;
   a plurality of symbol length registers, wherein each symbol length register stores a corresponding symbol length;
   a plurality of uplink attribute registers for storing the uplink slot attributes of corresponding slots;
   a plurality of downlink attribute registers for storing the downlink slot attributes of the corresponding slots;
   a plurality of special slot attribute registers for storing the special slot attributes of the corresponding slots;
   an uplink downlink delay register for storing uplink and downlink delays;
   an uplink configuration length register for storing an uplink configuration length; and
   a downlink configuration length register for storing a downlink configuration length.

6. The RF timer of claim 1, wherein the timing reference is at least one of pulse-per-second signal from a global positioning system (GPS) satellite, trigger input from IEEE 1588 standard protocol, and timing reference from a cellular network.

7. A wireless communication device capable of operating in a plurality of different cellular networks, comprising:
   a radio-frequency (RF) timer for generating a plurality of timing events, wherein the RF timer comprises:
      a memory module for storing a plurality of sets of network parameters corresponding to the plurality of different cellular networks;
      a plurality of programmable registers, coupled to the memory module, that are configured using at least one of the sets of network parameters; and
      an event generation logic circuit, coupled to the plurality of programmable registers, for generating the plurality of timing events based on a first set of the network parameters corresponding to a first cellular network for enabling the wireless communication device to operate in the first cellular network,
   wherein the wireless communication device transmits and receives data in a plurality of frames, each frame including a plurality of sub-frames, each sub-frame including a plurality of slots, and each slot including a plurality of symbols, and
   wherein the plurality of slots are synchronized using a timing reference that is common between the wireless communication device and a cellular network.

8. The wireless communication device of claim 7, wherein the plurality of cellular networks operate in accordance with at least one of wideband code division multiple access (W-CDMA), narrowband CDMA (N-CDMA), global system for mobile communications (GSM), and long term evolution (LTE) standards.

9. The wireless communication device of claim 7, wherein the wireless communication device communicates in at least one of time-division duplex (TDD) and frequency-division duplex (FDD) modes.

10. The wireless communication device of claim 7, wherein a set of network parameters includes at least one of sub-frames in a frame count, slots in a sub-frame count, chips in a slot count, symbols in a slot count, symbol length, uplink downlink delays, downlink pilot time slot (DwPTS) length, uplink pilot time slot (UpPTS) length, uplink slot attribute, downlink slot attribute, special slot attribute, uplink configuration length, and downlink configuration length in accordance with an operation standard of a cellular network.

11. The wireless communication device of claim 10, wherein the plurality of programmable registers includes at least one of:
    a sub-frame-per-frame register for storing the sub-frames in a frame count;
    a slot-per-sub-frame register for storing the slots in a sub-frame count;
    a chips-per-slot register for storing the chips in a slot count;
    a symbols-per-slot register for storing the symbols in a slot count;
    a plurality of symbol length registers, wherein each symbol length register stores a corresponding symbol length;
    a plurality of uplink attribute registers for storing the uplink slot attributes of corresponding slots;
    a plurality of downlink attribute registers for storing the downlink slot attributes of the corresponding slots;
    a plurality of special slot attribute registers for storing the special slot attributes of the corresponding slots;
    an uplink downlink delay register for storing uplink and downlink delays;
    an uplink configuration length register for storing an uplink configuration length; and
    a downlink configuration length register for storing a downlink configuration length.

12. The wireless communication device of claim 7, wherein the timing reference is at least one of pulse-per-second signal from a global positioning system (GPS) satellite, trigger input from IEEE 1588 standard protocol, and timing reference from a cellular network.

13. A method for generating a plurality of timing events by a radio-frequency (RF) timer of a wireless communication device to enable the wireless communication device to operate in a plurality of different cellular networks, the method comprising:
    storing a plurality of sets of network parameters corresponding to the plurality of different cellular networks in a memory module of the RF timer;
    programming a plurality of programmable registers in the RF timer using a first set of the network parameters corresponding to a first cellular network of the plurality of different cellular networks; and
    generating the plurality of timing events by the RF timer based on the first set of the network parameters to enable wireless communication device to operate in the first cellular network,
    wherein the wireless communication device transmits and receives data in a plurality of frames, each frame including a plurality of sub-frames, each sub-frame including a plurality of slots, and each slot including a plurality of symbols, and
    wherein the plurality of slots are synchronized using a timing reference that is common between the wireless communication device and a cellular network.

14. The method of claim 13, wherein the plurality of cellular networks operate in accordance with at least one of wideband code division multiple access (W-CDMA), narrowband CDMA (N-CDMA), global system for mobile communications (GSM), and long term evolution (LTE) standards.

15. The method of claim 13, wherein a set of network parameters includes at least one of sub-frames in a frame count, slots in a sub-frame count, chips in a slot count, symbols in a slot count, symbol length, uplink downlink delays, downlink pilot time slot (DwPTS) length, uplink pilot time slot (UpPTS) length, uplink slot attribute, downlink slot attribute, special slot attribute, uplink configuration length, and downlink configuration length in accordance with an operation standard of a cellular network.

* * * * *